(12) United States Patent
Jankovic et al.

(10) Patent No.: US 6,708,102 B2
(45) Date of Patent: Mar. 16, 2004

(54) METHOD AND SYSTEM FOR PREDICTING CYLINDER AIR CHARGE IN AN INTERNAL COMBUSTION ENGINE FOR A FUTURE CYLINDER EVENT

(75) Inventors: Mrdjan J. Jankovic, Birmingham, MI (US); Stephen William Magner, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 89 days.

(21) Appl. No.: 10/210,547

(22) Filed: Aug. 1, 2002

(65) Prior Publication Data

US 2004/0024517 A1 Feb. 5, 2004

(51) Int. Cl.[7] .............................................. F02D 41/04
(52) U.S. Cl. ........................ 701/102; 701/115; 73/117.3
(58) Field of Search ................................ 701/102, 110, 701/115; 123/399, 435, 676; 73/117.3

(56) References Cited

U.S. PATENT DOCUMENTS

| 4,928,654 A | * | 5/1990 | Hosaka ........................ 123/480 |
| 5,159,914 A | | 11/1992 | Follmer et al. |
| 5,205,260 A | * | 4/1993 | Takahashi et al. ......... 73/118.2 |
| 5,357,932 A | | 10/1994 | Clinton et al. |
| 5,522,367 A | | 6/1996 | Reuschenbach et al. |
| 6,116,210 A | * | 9/2000 | Oder et al. .................. 123/435 |
| 6,282,485 B1 | | 8/2001 | Kotwicki et al. |
| 6,651,492 B2 | * | 11/2003 | Kolmanovsky et al. ..... 73/118.2 |

FOREIGN PATENT DOCUMENTS

JP          8-326593      * 12/1996   ........... F02D/45/00

* cited by examiner

Primary Examiner—Hieu T. Vo

(57) ABSTRACT

A system and method for predicting cylinder air charge in an internal combustion engine for a future cylinder event is provided. The pressure in an intake manifold is calculated and an estimated position for a throttle plate of the engine at least one cylinder event in the future is determined responsive to an electronic throttle control command. A rate of change of pressure in the intake manifold is then estimated responsive to the measured intake manifold pressure and the estimated throttle plate position. The cylinder air charge is then calculated responsive to the rate of change in pressure in the intake manifold.

15 Claims, 2 Drawing Sheets

METHOD AND SYSTEM FOR PREDICTING CYLINDER AIR CHARGE IN AN INTERNAL COMBUSTION ENGINE FOR A FUTURE CYLINDER EVENT

BACKGROUND OF THE INVENTION

1. Field of the Invention

The present invention is generally related to controlling an internal combustion engine, and more particularly, to a method and system for predicting cylinder air charge for a future cylinder event.

2. Background Art

The air-fuel ratio in an internal combustion engine affects both engine emissions and performance. Accordingly, conventional vehicles include systems for controlling the air-fuel ratio in the engine to comply with modern emissions standards, increase fuel economy and improve drivability.

Conventional engine control systems estimate the mass of air entering each cylinder of the engine (referred to as air charge). These conventional systems typically employ a mass airflow (MAF) sensor or manifold absolute pressure (MAP) sensor to generate an input to an air induction model based on manifold filling and volumetric efficiency. Once the mass of charged air entering the cylinder is determined, the systems attempt to match the mass of charged air with an appropriate amount of injected fuel to maintain an optimal air-fuel ratio.

Determining the amount of injected fuel at the time of induction into the cylinder, however, presents several problems. There is typically a time delay between the issuance of a fueling command by the control system and injection of the fuel into a cylinder resulting from physical limitations of the fuel delivery system. This is particularly problematic at high engine speeds and loads where there is less time between engine events. Further, it is desirable to complete fuel injection before the intake valve opens to protect the combustion chamber and to atomize the fuel with the rush of air into the cylinder caused by the initial opening of the intake valve. As a result, estimation of air charge concurrent with actual induction of air into the cylinder occurs too late in the combustion process.

Several systems and methods have been developed that predict the air charge for future cylinder events. For example, in SAE 2000-01-0258, Allen J. Kotwicki et al., "An Algorithm to Compensate for Air Charge Prediction Errors," SAE 2000 World Congress, Detroit, Mich., Mar. 6–9 2000, a method is disclosed for determining the cylinder air charge for a future cylinder event using a signal from a mass air flow (MAF) sensor. Commonly assigned U.S. Pat. No. 6,170,475 B1, the entire disclosure of which is incorporated herein by reference, discloses a system and method for determining the cylinder air charge one or more cylinder events into the future for an engine having a conventional mechanically controlled throttle plate and a manifold absolute pressure (MAP) sensor. These systems and methods, however, still suffer from a relatively high level of uncertainty in their air charge predictions.

The inventors herein have recognized a need for a method and system for controlling an engine that will minimize and/or eliminate one or more of the above-identified deficiencies.

SUMMARY OF INVENTION

The present invention provides a method and a system for predicting cylinder air charge in an internal combustion engine for a future cylinder event.

A method in accordance with the present invention includes the steps of calculating a pressure in an intake manifold of the engine and estimating a position for an electronically controlled throttle plate of the engine at least one cylinder event in the future in response to a command from an electronic throttle control. The method also includes the step of estimating the rate of change of pressure in the intake manifold responsive to the previously measured intake manifold pressure and the estimated position of the electronically controlled throttle plate. Finally, the method includes the step of calculating the cylinder air charge for the future cylinder event responsive to the rate of change of pressure in the intake manifold.

A system in accordance with the present invention includes an electronic control unit that is configured to calculate a pressure in the intake manifold of the engine and estimate a position of the throttle plate of the engine at least one cylinder event in the future responsive to an electronic throttle control command. The electronic control unit is further configured to estimate the rate of change of pressure in the intake manifold responsive to the previously measured intake manifold pressure and the estimated position of the electronically controlled throttle plate. Finally, the electronic control unit is configured to calculate the cylinder air charge for the future cylinder event responsive to the rate of change of pressure in the intake manifold.

The present invention represents an improvement as compared to conventional systems and method for predicting cylinder air charge for future cylinder events. The inventive system and method use the delay between an electronic throttle control (ETC) command and actual throttle positioning responsive to the command to better anticipate the air flow at a cylinder intake port during a future cylinder event. In this manner, the inventive system and method reduce the uncertainty found in conventional systems and methods. Further, the inventive system and method predict future air charge without the use of a manifold absolute pressure sensor.

These and other advantages of this invention will become apparent to one skilled in the art from the following detailed description and the accompanying drawings illustrating features of this invention by way of example.

DETAILED DESCRIPTION OF THE DRAWINGS

Figure 1:
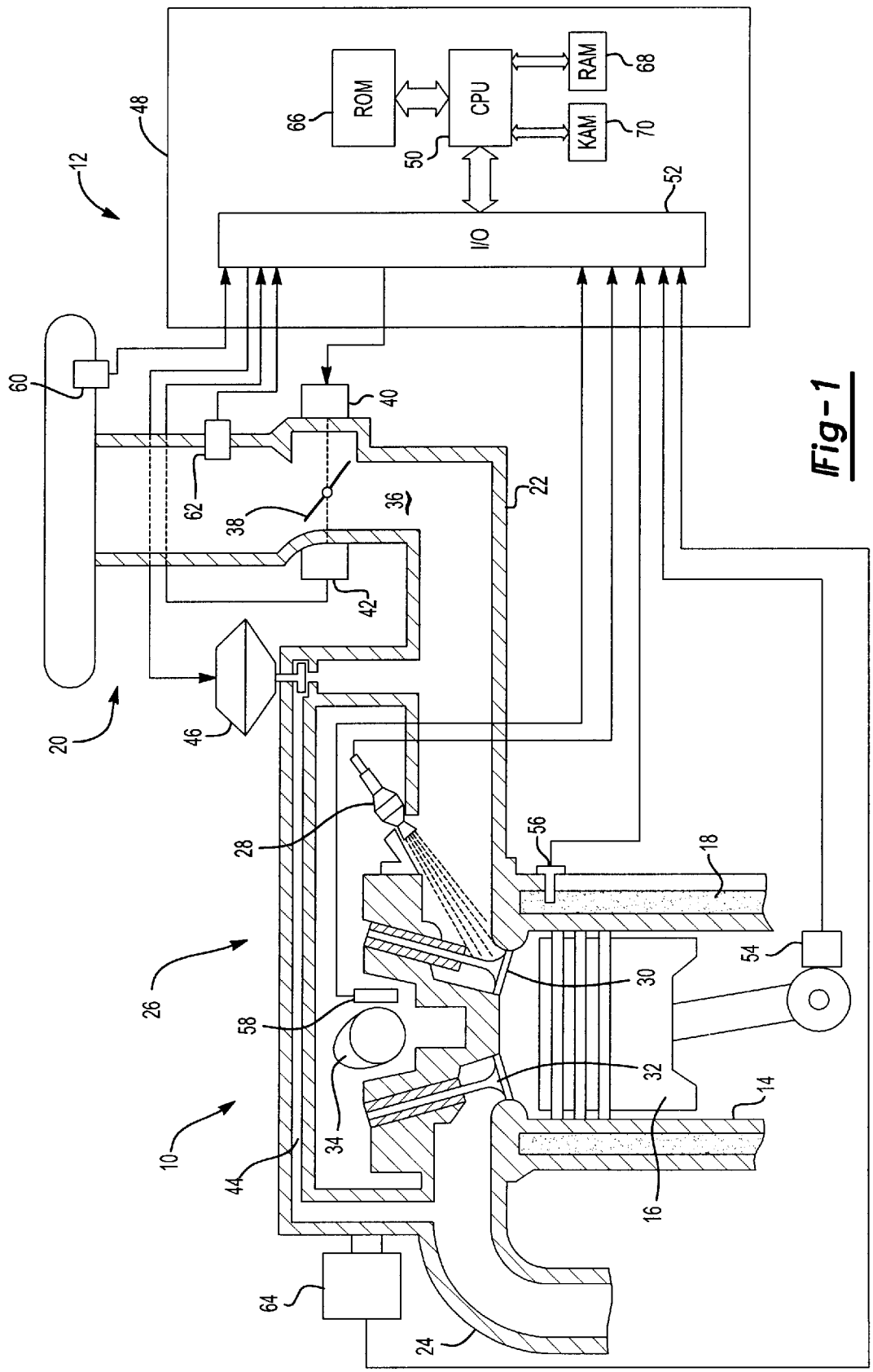
FIG. 1 is a schematic diagram illustrating an internal combustion engine incorporating a system for predicting cylinder air charge for a future cylinder event of the engine in accordance with the present invention.

Referring now to the drawings wherein like reference numerals are used to identify identical components in the various views, FIG. 1 illustrates an internal combustion engine 10 and a system 12 in accordance with the present invention for controlling engine 10. In particular, system 12 controls engine to regulate the air fuel ratio in engine 10 during combustion in order to control emissions and improve performance of engine 10.

Engine 10 is designed for use in a motor vehicle. It should be understood, however, that engine 10 may be used in a wide variety of applications. Engine 10 provides motive energy to a motor vehicle or other device and is conventional in the art. Engine 10 may define a plurality of combustion chambers or cylinders 14 and may also include a plurality of pistons 16 coolant passages 18, a throttle assembly 20, an intake manifold 22, an exhaust manifold 24, and engine gas recirculation (EGR) system 26, fuel injectors 28, intake valves 30, exhaust valves 32, and a camshaft 34. Engine may also include spark plugs (not shown) and an ignition system (not shown) as is known in the art.

Cylinders 14 provide a space for combustion of an air/fuel mixture to occur and are conventional in the art. In the illustrated embodiment, only one cylinder 14 is shown. It will be understood, however, that engine 10 may define a plurality of cylinders 14 and that the number of cylinders 14 may be varied without departing from the spirit of the present invention.

Pistons 16 are coupled to a crankshaft (not shown) and drive the crankshaft responsive to an expansion force of the air fuel mixture in cylinders 14 during combustion. Pistons 16 are conventional in the art and a piston 16 may be disposed in each cylinder 14.

Coolant passages 18 provide a means for routing a heat transfer medium, such as a conventional engine coolant, through engine 10 to transfer heat from cylinders 14 to a location external to engine 10. Passages 18 are conventional in the art.

Throttle assembly 20 controls the amount of air delivered to intake manifold 22 and cylinders 14. Assembly 20 is conventional in the art and may include a throttle body 36 and a an electronically controlled throttle plate 38 disposed therein for regulating the amount of airflow through body 36 to manifold 22. Plate 38 may be driven by an electronically controlled actuator 40. A sensor 42 may provide a feedback signal indicative of the actual position of plate 38 to implement closed loop control of plate 38.

Intake manifold 22 provides a means for delivering charged air to cylinders 14. Manifold 22 is conventional in the art. An inlet port is disposed between manifold 22 and each cylinder 14.

Exhaust manifold 24 is provided to vent exhaust gases from cylinders 14 after each combustion event. Manifold 24 is also conventional in the art. An exhaust port is disposed between manifold 24 and each cylinder 14.

EGR system 26 is provided to return a portion of the exhaust gases to cylinders 14 in order to reduce emissions of combustion by-products. EGR system 24 includes a passage 44 that extends from exhaust manifold 24 to intake manifold 22 and an EGR valve 46 that may be disposed within passage 44 to control the delivery of recirculated exhaust gases to intake manifold 22.

Fuel injectors 28 are provided to deliver fuel in controlled amounts to cylinders 14 and are conventional in the art. Although only one fuel injector 28 is shown in the illustrated embodiment, it will again be understood that engine 10 will include additional fuel injectors 28 for delivering fuel to other cylinders 14 in engine 10.

Intake valves 30 open and close each intake port to control the delivery of air to the respective cylinder 14. Intake valves 30 are conventional in the art. Although only one intake valve 30 is shown in the illustrated embodiment, it should be understood that multiple intake valves 30 may be used for each cylinder 14.

Exhaust valves 32 open and close each exhaust port to control the venting of exhaust gases from the respective cylinder 14 and are also conventional in the art. Again, although only one exhaust valve 32 is shown in the illustrated embodiment, it should be understood that multiple exhaust valves 32 may be used for each cylinder 14.

Camshaft 34 is provided to control the movement of intake valves 30 and exhaust valves 32 and is conventional in the art. It should be understood that multiple camshafts may be used to control valves 30, 32.

System 12 is provided to control engine 10. In particular, system 12 is provided to predict the air charge for a future cylinder event in one or more of the cylinders 14 of engine 10. System 12 may include an electronic control unit (ECU) 48.

ECU 48 is provided to control engine 10. ECU 48 may comprise a programmable microprocessor or microcontroller or may comprise an application specific integrated circuit (ASIC). ECU 48 may include a central processing unit (CPU) 50 and an input/output (I/O) interface 52. Through interface 52, ECU 48 may receive a plurality of input signals including signals generated by sensor 42 and conventional sensors such as a profile ignition pickup (PIP) sensor 54, a engine coolant temperature sensor 56, a cylinder identification (CID) sensor 58, an air temperature sensor 60, a mass air flow (MAF) sensor 62, and an exhaust gas oxygen sensor 64. Also through interface 52, ECU 48 may generate a plurality of output signals including one or more signals used to control fuel injectors 28, throttle plate 38 and EGR valve 46. ECU 58 may also include one or more memories including, for example, Read Only Memory (ROM) 66, Random Access Memory (RAM) 68, and a Keep Alive Memory (KAM) 70 to retain information when the ignition key is turned off.

Figure 2:
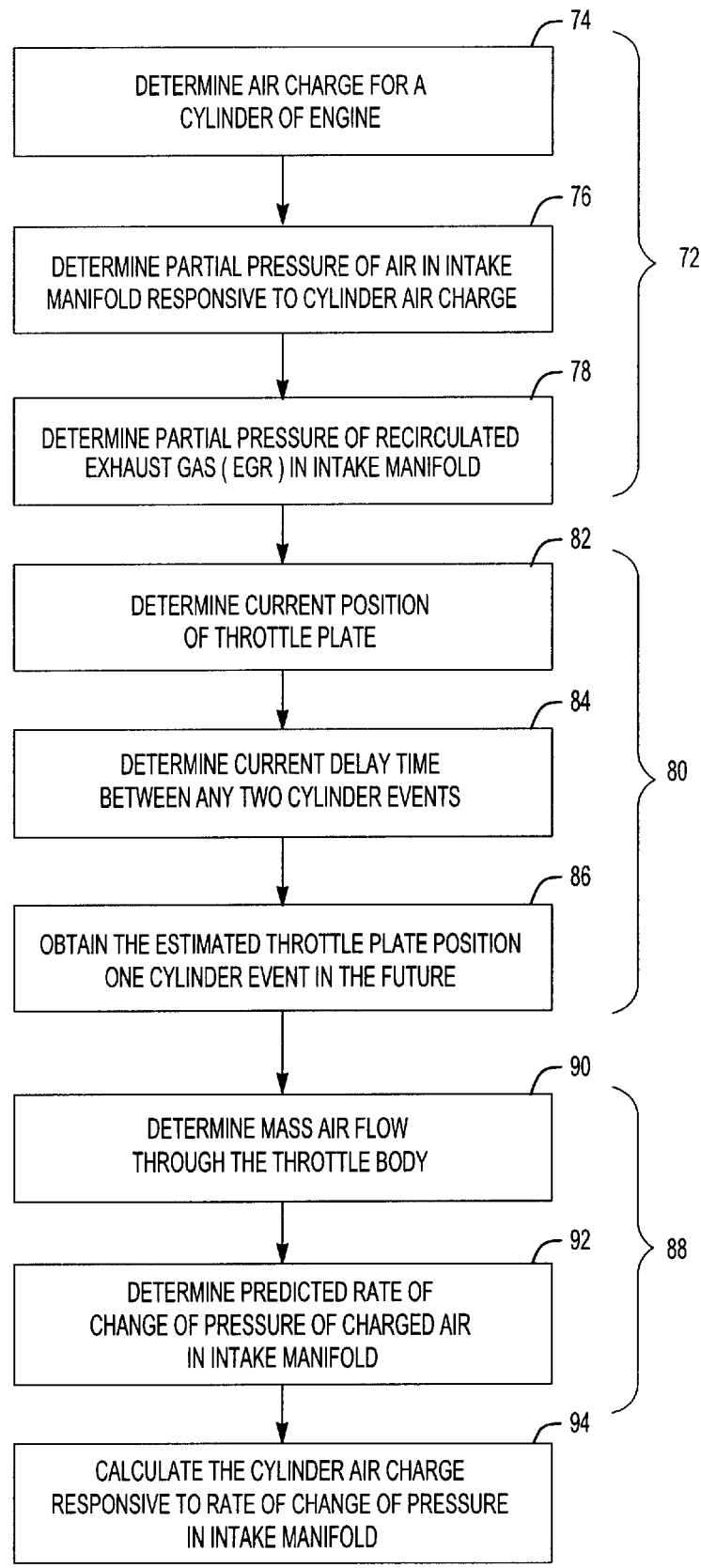
FIG. 2 is a flow chart diagram illustrating a method for predicting cylinder air charge for a future cylinder event in an internal combustion engine in accordance with the present invention.

Referring now to FIG. 2 a method in accordance with one embodiment of the present invention for predicting cylinder air charge for a future cylinder event of engine 10 will be described in detail. The inventive method or algorithm may be implemented by system 12 wherein ECU 48 is configured to perform several steps of the method by programming instruction or code (i.e., software). The instructions may be encoded on a computer storage medium such as a conventional diskette or CD-ROM and may be copied into one of memories 66, 68, 70 of ECU 48 using conventional computing devices and methods.

The inventive method may begin with the step 72 of calculating a pressure in intake manifold 22 of engine 10. Step 72 may include several substeps 74, 76, 78. In substep 74, the air charge $M_{cyl}(k)$ for a cylinder 14 of engine 10 is determined. ECU 48 may determine the cylinder air charge $M_{cyl}(k)$ using known methods based on the mass air flow into intake manifold 22 as detected by mass air flow sensor 62. Commonly assigned U.S. Pat. No. 5,331,936, the entire disclosure of which is incorporated herein by reference, discloses a method and apparatus for inferring the actual air charge in an internal combustion engine during transient conditions.

In substep 76, a partial pressure of air $P_{air}(k)$ in intake manifold 22 is determined responsive to the cylinder air charge $M_{cyl}(k)$. ECU 48 may determine the partial pressure of air $P_{air}(k)$ as follows:

$$P_{air}(k) = \frac{M_{cyl}(k)\beta_1(k)}{1 - \beta_2(k)\frac{P_{amb}(i)}{P_{amb\_nom}(i)P_M(k-1)}}$$

where $\beta_1$ is a coefficient corresponding to the slope of a function mapping pressure in intake manifold 22 against cylinder air charge, $\beta_2$ is a coefficient corresponding to an offset in the same function; $P_{amb}(i)$ is the ambient air pressure, $P_{amb\_nom}(i)$ is a previously obtained nominal value of the ambient air pressure determined under predetermined conditions, and $P_m(k-1)$ is a previously determined value for the pressure in intake manifold 22.

In substep 78, a partial pressure of recirculated exhaust gas $P_{egr}(k)$ in intake manifold 22 is determined. ECU 48 may determine the partial pressure of air $P_{egr}(k)$ as follows:

$$P_{egr}(k) = \frac{P_{egr}(k-1) + delT \frac{RT_M(k)}{V_M} \dot{M}_{egr}(k)}{\frac{RT_M(k)F_{temp}(T_{amb}, T_{eng})}{V_M \beta_1(k)}\left[1 - \beta_2(k)\frac{P_{amb}(i)}{P_M(k-1)P_{amb\_nom}}\right] + \frac{T_M(k-1)}{T_M(k)}}$$

where $P_{egr}(k-1)$ is the partial pressure of recirculated exhaust gas for a prior cylinder event, delT is the time period between cylinder events, R is the specific gas constant, $T_m$ is the temperature in the intake manifold 22, $V_m$ is the volume of intake manifold 22, $\dot{M}_{egr}(k)$ is the flow of recirculated exhaust gas into intake manifold 22 (which may be calculated as set forth in U.S. Pat. No. 6,098,602, the entire disclosure of which is incorporated herein by reference), $F_{temp}(T_{amb}, T_{eng})$ a function used to adjust the equation for the effects of ambient engine temperature differences between actual operating conditions and the original engine mapping conditions, and $\beta_1$, $\beta_2$, $P_{amb}(i)$, $P_{amb\_nom}(i)$, and $P_m(k-1)$ are as set forth hereinabove. The total intake manifold pressure $P_m(k)$ may then be calculated as follows:

$$P_M(k) = P_{air}(k) + P_{egr}(k)$$

Referring again to FIG. 2, the inventive method may continue with the step 80 of estimating a position of throttle plate 38 at least one cylinder event in the future. Step 80 may include several substeps 82, 84, 86. In substep 82, the current position tp_meas(k) of throttle plate 38 is determined. ECU 48 may determine the position tp_meas(k) using the signal generated by sensor 42. In substep 84, the current delay time delT between any two cylinder events in engine 10 is determined. ECU 48 may determine the delay time delT responsive to engine speed as indicated by sensor 54 or in other ways customary in the art. In substep 86, an electronic throttle control command tp_com(k) and the measured position of throttle plate 38 tp_meas(k) are weighted responsive to the delay time delT to obtain the estimated throttle plate position one cylinder even in the future as follows:

$$\theta^{+1}(k) = \min\left[1, \frac{delT}{ETC\_delay}\right]tp\_com(k) + \left(1 - \min\left[1, \frac{delT}{ETC\_delay}\right]\right)tp\_meas(k)$$

The present invention takes advantage of the delay ETC_delay between issuance of the electronic throttle control command tp_com(k) and the actual positioning of plate 38 responsive to the command. At low engine speeds, the delay delT between cylinder events is relatively large which favors use of the commanded throttle position tp_com(k) in estimating future throttle position. At higher engine speeds, however, cylinder events occur much more quickly and often in less time than ETC_delay, thereby favoring use of the measured throttle plate position tp_meas(k).

Referring again to FIG. 2, the inventive method may continue with the step 88 of estimating a rate of change of pressure in intake manifold 22 responsive to the previously calculated pressure $P_m(k)$ in intake manifold 22 and the estimated throttle plate position $\theta^{+1}(k)$. The rate of change of pressure in intake manifold 22 between any two cylinder events may be characterized as follows:

$$x(k) = \frac{P_{air}(k+1) - P_{air}(k)}{delT}$$

The partial pressure of air Pair in intake manifold 22 may be obtained using the ideal gas law:

$$\dot{P}_{air} = \frac{RT_M}{V_M}(\dot{M}_0 - \dot{M}_{cyl})$$

where R is the specific gas constant, $T_m$ is the temperature in intake manifold 22 as sensed by a temperature sensor within manifold 22 (not shown) $V_m$ is the volume of intake manifold 22, $\dot{M}_\theta$ is the mass air flow through throttle body 36 and $\dot{M}_{cyl}$ is the mass air flow through the intake port of cylinder 14. The mass air flow $\dot{M}_{cyl}$ may be characterized as follows:

$$\dot{M}_{cyl} = \frac{P_{air}}{\beta_1 * delT} - \frac{\beta_2}{\beta_1 * delT}$$

By differentiating both sides of the equation for $P_{air}$ and ignoring the derivative of the offset term $$-\frac{\beta_2}{\beta_1 * delT},$$

the following equation is obtained:

$$\ddot{P}_{air} = \frac{RT_M}{V_M}\left(\frac{d}{dt}\dot{M}_\theta - \frac{d}{dt}\left(\frac{1}{\beta_1(k) * delT}\right)P_{air} - \left(\frac{1}{\beta_1(k) * delT}\right)\dot{P}_{air}\right)$$

This equation may be discretized and combined with the equation for the rate of change of pressure in intake manifold 22 to obtain:

$$x(k+1) = \left[1 - \frac{RT_M}{V_M}\frac{1}{\beta_1(k)}\right]x(k) + \frac{RT_M}{V_M}\Delta\dot{M}_\theta(k) - \frac{RT_M}{V_M}\Delta\left(\frac{1}{\beta_1(k) * delT}\right)P_{air}(k)$$

Step 88 may include substeps 90, 92. In substep 90, the mass airflow through throttle body 36 of engine 10 is determined responsive to the intake manifold pressure $M_p(k)$ and the estimated throttle plate position $\theta^{+1}$. In step 92, the rate of change in pressure of the charged air in cylinder 14 relative to the pressure in intake manifold 22 is determined. In particular, the term $\Delta\dot{M}_\theta^{+1}(k)$—representing a change in mass air flow through throttle body 36—in the above equation for the change in the rate of pressure in intake manifold 22 may be characterized as follows:

$$\Delta\dot{M}_\theta^{+1}(k) = \dot{M}_\theta^{+1}(k+1) - \dot{M}_\theta^{+1}(k)$$

The rate of change in the slope that relates the intake manifold pressure and cylinder air-flow may be characterized as follows:

$$\Delta\left(\frac{1}{\beta_1(k)*delT}\right) = \left(\frac{1}{\beta_1(k+1)*delT}\right) - \left(\frac{1}{\beta_1(k)*delT}\right)$$

The values for $\dot{M}_\theta^{+1}(k+1)$ and the future engine speed are not yet available. Accordingly, the rate of change of speed of engine 10 is assumed to be constant between any two cylinder events and the above two equations are modified as follows:

$$\Delta \dot{M}_\theta^{+1}(k) = \dot{M}_\theta^{+1}(k) - \dot{M}_\theta^{+1}(k-1)$$

and $$\Delta\left(\frac{1}{\beta_1(k-1)*delT}\right) = \left(\frac{1}{\beta_1(k)*delT}\right) - \left(\frac{1}{\beta_1(k-1)*delT}\right)$$

The term $\dot{M}_\theta^{+1}(k)$ is obtained by adjusting the previously obtained pressure $P_m(k)$ in intake manifold 22 with the incremental pressure increase anticipated:

$$\dot{M}_\theta^{+1}(k) = \frac{P_{amb}(i)}{P_{amb\_nom}} \sqrt{\frac{T_{amb\_nom}}{T_{amb}(i)}} F_{thr}(\theta^{+1}(k)) F_{ss}\left(\frac{P_m(k) + delT*x(k)}{P_{amb}(i)}\right)$$

were $P_{amb}(i)$ and $T_{amb}(i)$ are the ambient pressure and temperature, respectively, as measured at a time (i) indicative of a slower rate than k, $P_{amb\_nom}$ and $T_{amb}$ nom are previously obtained nominal pressure and temperature values determined under predetermined conditions, $F_{thr}$ is the sonic throttle mass flow and $F_{ss}$ is the sub-sonic flow correction factor accounting for flow reduction as the pressure ration reaches one as set forth in U.S. Pat. No. 6,098,602, the entire disclosure of which is incorporated herein by reference. The term $\dot{M}_\theta^{+1}(k-1)$ is obtained using the previously obtained pressure $P_m(k)$ in intake manifold 22 and the estimated throttle plate position $\theta^{+1}$ as follows:

$$\dot{M}_\theta^{+1}(k-1) = \frac{P_{amb}(i)}{P_{amb\_nom}} \sqrt{\frac{T_{amb\_nom}}{T_{amb}(i)}} F_{thr}(\theta^{+1}(k-1)) F_{ss}\left(\frac{P_m(k)}{P_{amb}(i)}\right)$$

Using these equations, the equation for the change in the rate of pressure in intake manifold 22 can be modified as follows:

$$x(k+1) = \left[1 - \frac{RT_m}{V_m}\frac{1}{\beta_1(k)}\right]x(k) + \frac{RT_m}{V_m}\Delta \dot{M}_\theta^{+1}(k) - \frac{RT_m}{V_m}\Delta\left(\frac{1}{\beta_1(k-1)*delT}\right)P_{air}(k)$$

Referring again to FIG. 2, the inventive method may continue with the step 94 of calculating the cylinder air charge responsive to the rate of change of pressure in intake manifold 22. Because the partial pressure $P_{air}(k)$ of air in the intake manifold and the total pressure $P_M(k)$ will increase by the same amount, the pressure ratio across the throttle body 36 will not change significantly and the following approximation may be used:

$$\frac{P_{air}^{+2}(k)}{P_M(k) + delT(x(k) + x(k+1))} \approx \frac{P_{air}(k)}{P_M(k)}$$

This equation may be rearranged in the following manner for cylinder air charge:

$$\frac{P_{air}^{+2}(k)}{delT*\beta_1(k)} = \frac{P_{air}(k)}{delT*\beta_1(k)} + \frac{[x(k) + x(k+1)]}{\beta_1(k)}$$

Multiplying both sides of the above equation by delT and subtracting $$\frac{\beta_s(k)*P_{air}(k)}{\beta_1(k)*P_M(k)}$$

from both sides, the following equation of future air charge is obtained:

$$\frac{P_{air}^{+2}(k)}{\beta_1(k)} - \frac{\beta_2(k)*P_{air}(k)}{\beta_1(k)*P_M(k)} = \frac{P_{air}(k)}{\beta_1(k)} - \frac{\beta_2(k)*P_{air}(k)}{\beta_1(k)*P_M(k)} + \frac{delT[x(k) + x(k+1)]}{\beta_1(k)}$$

or:

$$\text{air\_chg}^{+2}(k) = \frac{P_{air}(k)}{\beta_1(k)} - \frac{\beta_2(k)*P_{air}(k)}{\beta_1(k)*P_M(k)} + \frac{delT[x(k) + x(k+1)]}{\beta_1(k)}$$

or:

$$\text{air\_chg}^{+2}(k) = \text{air\_chg}(k) + \frac{delT[x(k) + x(k+1)]}{\beta_1(k)}$$

A system and method in accordance with the present invention represent a significant improvement as compared to conventional methods and systems for predicting future air charge in an engine cylinder. In particular, the inventive method and system use the delay between an electronic throttle control (ETC) command and actual throttle positioning responsive to the command to better anticipate the air flow at a cylinder intake port during a future cylinder event. In this manner, the inventive system and method reduce the uncertainty found in conventional systems and methods. Further, the inventive system and method predict future air charge without the use of a manifold absolute pressure sensor thereby reducing costs and increasing the flexibility of the system.

What is claimed is:

1. A method for predicting cylinder air charge in an internal combustion engine for a future cylinder event, said method comprising the steps of:
    calculating a pressure in an intake manifold of said engine;
    estimating a position for a throttle plate of said engine at least one cylinder event in the future in response to an electronic throttle control command;
    estimating a rate of change of pressure in said intake manifold responsive to said pressure and said estimated throttle plate position; and,
    calculating said cylinder air charge responsive to said rate of change of pressure in said intake manifold.

2. The method of claim 1 wherein said step of calculating said pressure in said intake manifold includes the substeps of:
    determining an air charge for a cylinder of said engine;
    determining a partial pressure of air in said intake manifold responsive to said cylinder air charge; and,
    determining a partial pressure of recirculated exhaust gas in said intake manifold.

3. The method of claim 1 wherein said step of estimating a position for said throttle plate includes the substeps of:

determining a current position of said throttle plate;

determining a delay time between first and second cylinder events in said engine; and, weighting said electronic throttle control command and said current position responsive to said delay time to obtain said estimated throttle plate position.

4. The method of claim 1 wherein said step of estimating a rate of change in pressure in said intake manifold includes the substep of:

determining a mass airflow through a throttle of said engine responsive to said pressure and said estimated throttle plate position; and, determining a rate of change of charged air in said cylinder relative to said pressure in said intake manifold.

5. The method of claim 1 wherein said future cylinder event is later in time then said one cylinder event.

6. A system for predicting cylinder air charge in an internal combustion engine for a future cylinder event, said system comprising:

an electronic control unit configured to calculate a pressure in an intake manifold of said engine, to estimate a position for a throttle plate of said engine at least one cylinder event in the future in response to an electronic throttle control command, to estimate a rate of change in pressure of said intake manifold responsive of said pressure and said estimated throttle plate position, and to calculate said cylinder air charge responsive to said rate of change of pressure in said intake manifold.

7. The system of claim 6 wherein said electronic control unit is further configured, in calculating said pressure in said intake manifold, to determine an air charge for a cylinder of said engine, to determine a partial pressure of air in said intake manifold responsive to said cylinder air charge, and to determine a partial pressure of recirculated exhaust gas in said intake manifold.

8. The system of claim 6 wherein said electronic control unit is further configured, in estimating said position of said throttle plate, to determine a current position of said throttle plate, to determine a delay time between first and second cylinder events in said engine, and to weight said electronic throttle control command and said current position responsive to said delay time to obtain said estimated throttle plate position.

9. The system of claim 6 wherein said electronic control unit is further configured, in estimating a rate of change in pressure in said intake manifold, to determine a mass airflow through a throttle of said engine responsive to said pressure and said estimated throttle plate position and to determine a rate of change of charged air in said cylinder relative to said pressure in said intake manifold.

10. The system of claim 6 wherein said future cylinder event is later in time then said one cylinder event.

11. An article of manufacture, comprising:

a computer storage medium having a computer program encoded therein for predicting cylinder air charge in an internal combustion engine for a future cylinder event, said computer program including:

code for calculating a pressure in an intake manifold of said engine;

code for estimating a position for a throttle plate of said engine at least one cylinder event in the future in response to an electronic throttle control command;

code for estimating a rate of change of pressure in said intake manifold responsive to said pressure and said estimated throttle plate position; and code for calculating said cylinder air charge responsive to said rate of change of pressure in said intake manifold.

12. The article of manufacture of claim 11 wherein said code for calculating said pressure in said intake manifold includes:

code for determining an air charge for a cylinder of said engine;

code for determining a partial pressure of air in said intake manifold responsive to said cylinder air charge; and, code for determining a partial pressure of recirculated exhaust gas in said intake manifold.

13. The article of manufacture of claim 11 wherein said code for estimating said position of said throttle plate includes:

code for determining a current position of said throttle plate;

code for determining a delay time between first and second cylinder events in said engine; and, code for weighting said electronic throttle control command and said current position responsive to said delay time to obtain said estimated throttle plate position.

14. The article of manufacture of claim 11 wherein said code for estimating a rate of change in pressure in said intake manifold includes:

code for determining a mass airflow through a throttle of said engine responsive to said pressure and said estimated throttle plate position; and, code for determining a rate of change of charged air in said cylinder relative to said pressure in said intake manifold.

15. The article of manufacture of claim 11 wherein said future cylinder event is later in time then said one cylinder event.

* * * * *